United States Patent

[11] 3,570,590

[72] Inventor  Siegfried Kofink
              Zell/Neckar, Germany
[21] Appl. No. 838,910
[22] Filed     July 3, 1969
[45] Patented  Mar. 16, 1971
[73] Assignee  J. Eberspacher
              Esslingen/Neckar, Germany
[32] Priority  July 29, 1968
[33]           Austria
[31]           A7388/68

[54] HEAT EXCHANGER CONSTRUCTION
     14 Claims, 3 Drawing Figs.
[52] U.S. Cl. .................................................. 165/39,
                                         165/51, 165/142
[51] Int. Cl. ...................................................... B60h 1/00
[50] Field of Search ........................................... 165/35, 36,
                                         39, 40, 51, 103, 142

[56]              References Cited
              UNITED STATES PATENTS
3,357,483  12/1967  Day ............................. 165/39

*Primary Examiner*—Charles Sukalo
*Attorney*—McGlew and Toren

ABSTRACT: A heat exchanger for a heating system preferably for the space heating of motor vehicles comprises a central inlet pipe for exhaust gases from the automotive engine which is surrounded by an inner annular chamber connected to a discharge line and by a surrounding outer annular chamber in which is located a heating coil for a secondary heating medium. The heat exchanger includes a control mechanism in the form of rotatable disc elements which may be aligned or offset for the purpose of permitting selective flow from the central exhaust pipe or conduit selectively to the inner annular chamber or to the outer annular chamber in accordance with the desire to heat the secondary medium to a greater or lesser degree. The secondary heating medium is then conducted through a separate closed circuit to a heat exchanger such as an automobile heater where a fan is employed to blow air over the heater for the purpose of warming the compartment space.

Patented March 16, 1971

3,570,590

INVENTOR
Siegfried Kofink by
McGlew & Toren
ATTORNEYS.

HEAT EXCHANGER CONSTRUCTION

SUMMARY OF THE INVENTION

This invention relates, in general, to heat exchangers, and, in particular, to a new heat exchanger system for space heaters, particularly for motor vehicles.

The present invention is particularly concerned with a space heater of a type in which a heating medium, for example an exhaust gas of an automotive engine, is conducted to give off its heat to a secondary heating medium which can be fed from a storage tank and which may be circulated in a closed system by a circulating pump. With such an arrangement the secondary medium can be used in association with a heat exchanger to supply hot air to the compartment space to be heated.

Car heaters are known which include exhaust gas heating systems for heating the interior of the compartment space. In the case of water cooled engines, the cooling water heated by the engine is fed to a heat exchanger which is similar to a hot water heater and it transfers its heat to air which is circulated over the heat exchanger such as by a fan. In the case of air cooled engines it has been known to utilize the air which is warmed by passing over the engine for heating the interior of the vehicle. It was found that the efficiencies of these latter heaters is low due to heat losses and also an extremely long heating period is required for an initial warming of the compartment space. In addition, the end temperatures in the compartment space which may be achieved by such heaters, especially when the car is reasonably ventilated, will not be sufficient. This is particularly true for cars with air cooled rear engines especially since the hot air lines in these cars are too long and they are exposed to the passing cold air. It is difficult and expensive to provide sufficient insulation for such lines.

In accordance with the present invention, there is provided a heating system preferably for motor vehicles with air cooled engines which operates with a great efficiency and is capable of heating the interior of an automobile compartment space, for example, and which utilizes the waste heat of the operating engine for transferring this heat to a secondary medium which is circulated to the compartment space in a closed system.

The invention has evolved upon the realization that the disadvantages of the known arrangements can be avoided only by using a special heat exchanger and a separate heat transfer medium in order to obtain an increase efficiency. The heat exchanger of the invention comprises an arrangement of annular compartments around a central supply tube for exhaust gases in a position such that one of the compartments may be filled with a plurality of coils for conducting a secondary medium therethrough in heat transfer with a portion or a major amount of the exhaust gases as desired in accordance with heating requirements. The construction includes an end chamber which communicates with the central exhaust chamber and to one or more of the annular chambers in accordance with the setting of a control which advantageously is in the form of a fixed and a rotatable disc member having openings which may be aligned or offset. Thus the exhaust gases may be conducted, either entirely or at least partly, through an annular chamber in which the secondary medium is passed through a conduit in the form of a continuous coiled pipe. The secondary medium is circulated through a closed system to a storage tank and then through a heat exchanger where the heat of the medium may be used for warming a compartment space in an automobile for example. In the preferred form the heat exchanger includes concentrically arranged tubular casings, the other one forming a conduit for the exhaust gases, a surrounding one forming a bypass conduit for conducting these gases to the discharge and an exterior one forming a chamber for the heating coils of the secondary medium. Flow of the exhaust gases selectively to the intermediate or to the outer chamber may be easily controlled by the provision of a disc assembly including a stationary disc and a rotatable disc. The discs have openings which may be aligned for a selective passage through one or both of the annular chambers which surround the central exhaust inlet pipe. The discs are such that they may be rotated for regulating the rate of flow selectively into either the bypass chamber when very little or no heating is required, or into the chamber containing the secondary medium coils for complete heating of the medium in these coils. A regulating element such as a thermostat in the conduit for the secondary medium is advantageously connected to the rotatable disc element for affecting a proper setting of this disc element in accordance with the heating requirements which are necessary. The use of the rotating disc for regulating an admission of the high temperature exhaust gases to the heating coils for the secondary medium permits rapid changes of heating conditions and also a very fine heating selection by the partial admission of the exhaust gases when desired.

The control mechanism in the form of rotating discs are advantageously arranged on a shaft adjacent one end of the concentrically arranged annular passages around the central high temperature gas heating chamber. This permits end flow around the heating chamber housing into a selected one of the separate annular passages which are defined around the exhaust gas tube. The pivot of the rotating discs is mounted in the element serving to deflect primary heat transfer medium or exhaust gases and it is closed to the outside by a spring loaded plane seal. This insures a reliable seal with relatively simple and inexpensive means which is favorable in terms of safety and efficiency. The sealing of a stationary disc part from a rotary part of a rotating control mechanism is effected preferably by the action of a spring pressing force. The position of the movable disc relative to the fixed disc is controlled, for example, by a thermostat consisting of an expansion element which is arranged to change the position of the disc in dependence on the supply temperature of the secondary heat transfer medium.

In some instances it is desirable to provide a flat valve made of a bimetallic material for the control of the flow of the exhaust gases in relation to the medium to be heated. It is also advantageous to increase at least the outer surface of the part serving to receive and guide the secondary heat transfer medium by suitable shaping, for example, by corrugation, grooving or fins. In the preferred arrangement the chamber in which the secondary medium coils are located is advantageously of annular configuration but of course a different configuration having a tortuous path, for example, may also be effectively employed for increased heat transfer.

In accordance with another embodiment of the invention the secondary medium advantageously comprises a substance such as diphenyl or isomeric triaryl dimethane which is introduced in liquid form into a separate secondary medium closed circuit In such an arrangement this substance usually evaporates in the heating coil located in the exhaust gas passage and condenses only in a heat exchanger which is adapted to be located in the compartment or space to be heated. With such arrangement there is an increased efficiency due to the evaporation of the substance.

Accordingly, it is an object of the invention to provide an improved heat exchanger particularly for use in association with a waste heat producing apparatus such as an automotive engine which includes a housing defining a plurality of annular chambers around a central inlet for the waste heat source with means for controlling the flow of the waste heat source medium for flow in association with a closed circuit coil or heat exchanger for a secondary medium and including a control for regulating the flow of the waste heat source in respect to the heating coil for the secondary medium; the control advantageously being in the form of a rotatable disc member and a stationary disc member having openings which may be aligned or offset for flow control variation.

A further object of the invention is to provide a heat exchanger which is simple in design, rugged in construction, and economical to manufacture.

The various features of novelty which characterize the invention are pointed out with particularity in the claims annexed to and forming a part of this specification. For a better understanding of the invention, its operating advantages and specific objects attained by its use, reference should be had to the accompanying drawings and descriptive matter in which there is illustrated and described a preferred embodiment of the invention.

GENERAL DESCRIPTION OF THE PREFERRED EMBODIMENT

Figure 1:
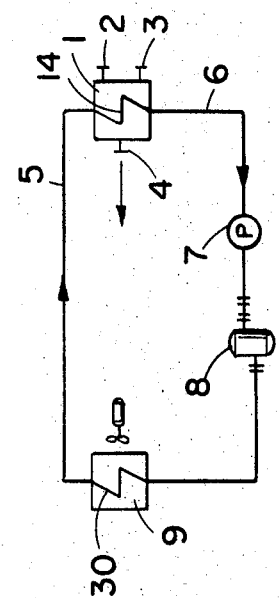
FIG. 1 is a schematic circuit diagram showing the arrangement of the secondary medium circuit in relation to the heat exchanger.

Referring to the drawings in particular, the invention embodied therein comprises as indicated in FIG. 1, a heat exchanger 1 having inlet connections 2 and 3 for receiving a waste heat medium such as the exhaust gases of an internal combustion engine. In the example shown, the conduits 2 and 3 are adapted to be connected to receive the exhaust gases of a four cylinder engine in which two cylinders are connected to each connection. The primary heat transfer medium such as exhaust gases leaves the heat exchanger 1 through an outlet connection 4. A secondary medium is directed through a conduit 5 and into a heat exchange section or coil 14 of the heat exchanger 1 where it is adapted to absorb heat from the primary heat transfer medium. The heated secondary medium is then delivered through a conduit 6 by a pump 7 into a storage tank 8 which is connected for delivery of this medium to a heat exchanger 9 which is adapted to be located for example, in a compartment space such as an automobile for heating this space. An electrically driven fan is associated with the heat exchanger 9 and is adapted to blow air to be heated in heat exchange relationship with a heat exchanged section 30 of the heat exchanger 9 in order to heat the air in the space.

Figure 3:
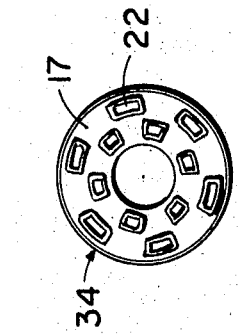
FIG. 3 is a front elevational view of a diaphragm control device for regulating the heat exchanger flow.
Figure 2:
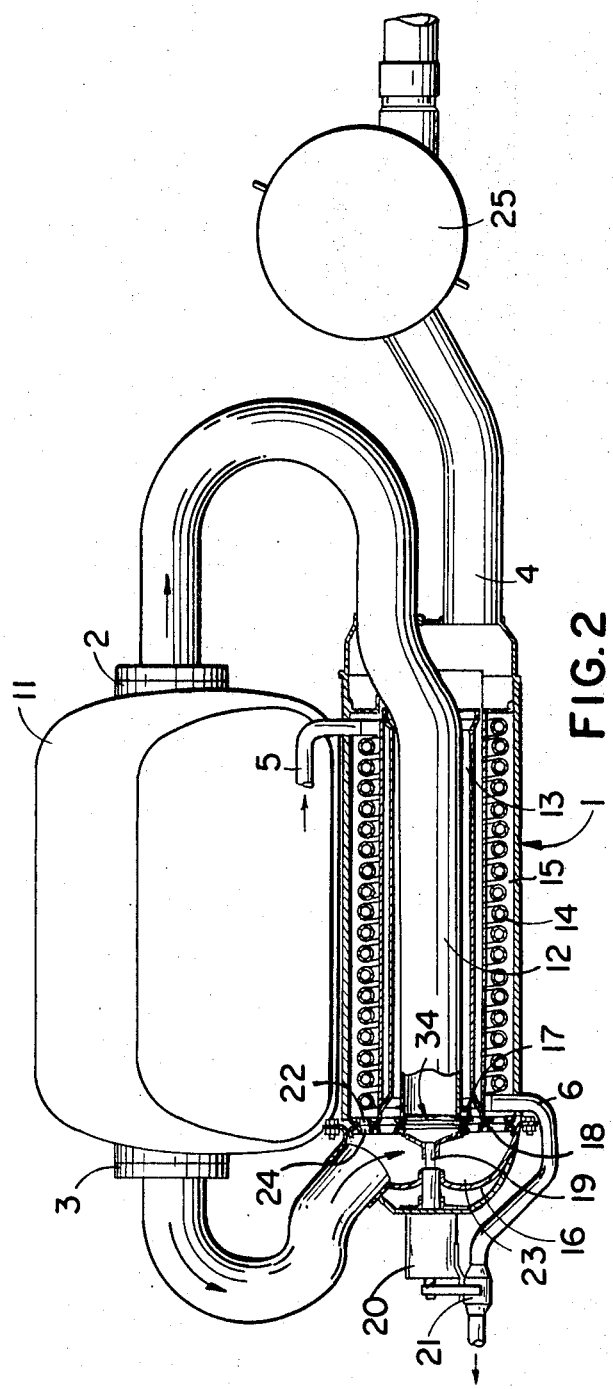
FIG. 2 is an axial sectional view of a heat exchanger constructed in accordance with the invention.

In accordance with the invention as indicated in FIG. 2, the heat exchanger 1 is adapted to use a waste heat from the exhaust gases of an automotive engine and for this purpose, it includes connecting conduits 2 and 3 which are adapted to be connected to an engine mount or exhaust gas manifold 11. In the embodiment illustrated the heat exchanger 1 is particularly applicable for use with an automotive engine four cylinder opposed cylinder type. The exhaust gases combined by the two cylinders are fed through the connections 2 and 3 into the heat exchanger. The exhaust gases of all cylinders can be collected and fed over a single connection 2 or through the two connection arrangements shown. The gases which flow through the connection 2 are delivered into a central tubular inlet or central pipe 12 having an end which abuts against a fixed disc 17 of a flow control diaphragm generally designated 34. The disc 17 is mounted against a rotating disc 18 and each includes a plurality of openings 22 and 24 which may be selectively aligned for the purpose of regulating the flow of the exhaust gases 12 into an end chamber 23 and from the end chamber into either an inner surrounding chamber or bypass 13 or an outer surrounding chamber or heat transfer chamber 15. A deflecting element 16 which closes the end of the chamber 23 facilitates the flow substantially by causing a flow direction change of 180° and permits joining of the flow with the flow through the inlet 3. A mixing of the hot gases takes place in the chamber 23, and, in accordance with the setting of the control 34, the gases may flow through the annular space 13 or the annular space 15 or simultaneously through each. The rotary disc is mounted on bearings 19 and 20 and the control of the movement of the disc is effected in dependence on the temperature in the supply line 6 carrying the secondary medium. The control is effected through an expansion element 21 and permits alignment or offsetting of the openings 22 of the disc 17 with the openings 24 of the disc 18.

Thus depending on the position of the two discs 17 and 18, relative to each other, the hard exhaust gases will be conducted either partially or fully past the coils 14 which carry the secondary medium. Thus, for example, the expansion element 21 can be selected so that with a given temperature of from 350 to 400° C the control mechanism 34 may be completely shut off, which would correspond to a "heat-off" position. In such case, the exhaust gases will be fed into the annular space 13 and out the outlet conduit 4 to an exhaust gas sound absorber or muffler 25 and from there to the atmosphere.

In a "heat-on" position, with full heating power, the entrance into the annular space 13 is closed completely and the entire gas from the conduit 12 and from the inlet conduit 3 is conducted into the annular space 15 for complete heat exchange with the coils 14 which carry the secondary heat transfer medium. In the closed system connected to the coils 14 as described previously, the transfer medium will evaporate and a superheated steam will then be fed through the supply line 6 to the heat exchanger 9. An evaporation of this medium is not absolutely necessary but the arrangement of the closed cycle with an evaporative type liquid does provide an increased thermodynamic efficiency. Because the medium is conducted in a closed conduit system a constant replenishment of the medium is not necessary.

I claim:

1. A heat exchanger, particularly for the space heating of automobiles, having an engine producing waste heat exhaust gases, comprising an inlet conduit for a primary heating medium such as a waste heat exhaust gas, a housing surrounding said inlet conduit defining a heat exchange section which communicates adjacent one end thereof with said inlet conduit and has an opposite end with a discharge, a secondary heating medium conduit having a heat exchanged portion located in said housing heat exchange section, and a control including first and second relatively movable members arranged adjacent the end of said inlet conduit and having openings therethrough which may be partially or completely aligned or offset to regulate the flow of the primary heating medium from said inlet conduit and through said housing heat exchanger section.

2. A heat exchanger, according to claim 1, wherein said housing also defines an intermediate chamber having one end communicating with said inlet conduit and an opposite end with a discharge, said control being located to also regulate the flow from said inlet conduit into said intermediate chamber.

3. A heat exchanger, according to claim 1, wherein said housing includes an end portion providing a deflector said housing heat exchange section comprising an annular chamber surrounding said inlet conduit and an intermediate annular chamber between said heat exchange section and said inlet conduit, said deflector portion deflecting gases permitted to flow through said control by 180° backwardly and selectively into said heat exchange section and to said intermediate chamber.

4. A heat exchanger, according to claim 1, wherein said secondary heating medium conduit comprises a closed conduit said conduit having a thermostat connected to said control and being operable to shift said first and second members relatively for the purpose of varying the amount of flow from said inlet conduit to said heat exchange section.

5. A heat exchanger, according to claim 1, wherein said first and second relatively movable members comprises a stationary disc arranged adjacent the end of said inlet conduit and a rotatable disc rotatably mounted adjacent said stationary disc, each of said discs having openings therethrough which may be selectively aligned.

6. A heat exchanger, according to claim 5, including a shaft mounted concentrically adjacent one end of said inlet conduit and carrying said rotatable discs.

7. A heat exchanger, according rotatably claim 6, including a deflector surrounding said shaft and rotatably supporting said shaft and acting to deflect said primary heating medium from said inlet conduit 180° into said heat exchanged section.

8. A heat exchanger, according to claim 7, including a spring loaded seal closing said shaft to the exterior of said housing.

9. A heat exchanger, according to claim 8, including means associated with said seal for applying positive pressure to said space surrounding said shaft.

10. A heat exchanger, according to claim 5, wherein said housing defines an intermediate chamber surrounding said inlet conduit having an opening to a discharge at one end and communicating with said inlet conduit at its opposite end said heat exchanger section comprising an annular chamber surrounding said intermediate chamber each of said heat exchange sections and said intermediate chamber communicating with said inlet conduit through said control, and a thermostat arranged in said secondary heating medium conduit and connected to said control for regulating the flow selectively to said intermediate chamber and to said heat exchanged section.

11. A heat exchanger, particularly for the space heating of automobiles having an engine which produced a waste heat exhaust gas, comprising a central tubular inlet conduit having means for connecting said conduit adjacent one end to a primary heating medium and having an opposite end, a fixed disc applicable across said opposite end of said inlet conduit, a rotatable disc rotatably mounted adjacent said fixed disc, said fixed disc and said rotatable disc comprising a control for the flow of said primary medium and having openings therein which may be aligned and offset for regulating said flow, a housing surrounding said conduit and defining an intermediate annular space surrounding said conduit and terminating at one end adjacent said fixed disc and at an opposite end in a discharge, an annular chamber defined by said housing around said intermediate chamber and providing a heat-exchange section which abuts at one end against said fixed disc and is opened at its opposite end into a discharge, said housing defining a chamber on the opposite side of said disc and said rotatable disc with deflector means for deflecting primary heating medium from said inlet conduit 180° backwardly selectively into said intermediate chamber and to said outer chamber having said heat exchanged section, and means for rotating said rotatable disc for varying the flow from said inlet conduit selectively into said intermediate chamber and said outer chamber having said heat exchanged section.

12. A heat exchanger, according to claim 11, including a continuous coil disposed in said heat exchange section or the heating of a secondary medium.

13. A heat exchanger, according to claim 12, including a separate closed circuit for a secondary heat exchange medium having a heat exchange coil portion located in said heat exchange section of said housing, thermostat means connected into said separate closed circuit for said secondary medium and connected to said rotatable disc for shifting said disc relative to said stationary disc regulating the flow of said primary heating medium through said heat-exchange section.

14. A heat exchanger, according to claim 12, including a second conduit for the primary heating medium connected into said end chamber.